United States Patent
Coakley (10) Patent No.: US 6,470,318 B1
(45) Date of Patent: Oct. 22, 2002

(54) COMPUTER-IMPLEMENTED TRADEMARK BROKERAGE NETWORK

(76) Inventor: Lisabeth H. Coakley, 110 Harlan Dr., Bloomfield Hills, MI (US) 48304

(*) Notice: Subject to any disclaimer, the term of this patent is extended or adjusted under 35 U.S.C. 154(b) by 0 days.

(21) Appl. No.: 09/260,585

(22) Filed: Mar. 1, 1999

(51) Int. Cl.[7] ............................................. G06F 17/28
(52) U.S. Cl. ................................ 705/1; 705/10; 707/1; 707/10; 703/2
(58) Field of Search .......................... 703/2; 705/1, 4, 705/7, 8, 100, 102, 10; 707/1, 10, 102, 100

(56) References Cited

U.S. PATENT DOCUMENTS

| | | | |
|---|---|---|---|
| 5,375,055 A | | 12/1994 | Togher et al. |
| 5,664,111 A | | 9/1997 | Nahan et al. |
| 5,815,665 A | * | 9/1998 | Teper et al. ............ 395/200.59 |
| 5,881,131 A | * | 3/1999 | Farris et al. ................... 379/27 |
| 5,915,025 A | * | 6/1999 | Lawrence .................. 455/31.2 |
| 5,950,173 A | * | 9/1999 | Perkowski .................... 705/26 |
| 5,991,751 A | * | 11/1999 | Rivette et al. .................. 707/1 |
| 5,999,907 A | | 12/1999 | Donner |
| 6,064,979 A | * | 5/2000 | Perkowski et al. ............ 705/26 |
| 6,115,641 A | | 9/2000 | Brown et al. |
| 6,154,725 A | * | 11/2000 | Donner ........................... 705/1 |
| 6,195,646 B1 | | 2/2001 | Grosh et al. |
| 6,233,682 B1 | | 5/2001 | Fritsch |
| 6,263,314 B1 | | 7/2001 | Donner |
| 6,266,651 B1 | | 7/2001 | Woolston |

OTHER PUBLICATIONS

Rivette et al., patent No. 5,991,751, issued in Nov. 1999, pp. 1–6.*

* cited by examiner

Primary Examiner—Frantzy Poinvil
Assistant Examiner—Thai Phan
(74) Attorney, Agent, or Firm—Harness, Dickey & Pierce, P.L.C.

(57) ABSTRACT

A computer-implemented method and system is provided for brokering trademarks between trademark owners and potential trademark buyers. The method and system receive trademarks from potential sellers and obtain identification descriptions associated with each of the trademarks. A trademark brokerage database is populated with the trademarks and with the descriptions. The trademarks in the trademark brokerage database are made available for acquisition by potential buyers. Access is provided to the trademark brokerage database for the potential buyers of the trademarks so that trademark queries can be received from the potential buyers related to the descriptions. Trademark query results are generated based upon which trademarks satisfy the received queries. The query results are presented to the potential buyers wherein at least one of the potential buyers acquires one of the trademarks that is in the trademark brokerage database based upon the query results.

12 Claims, 7 Drawing Sheets

COMPUTER-IMPLEMENTED TRADEMARK BROKERAGE NETWORK

BACKGROUND AND SUMMARY OF THE INVENTION

The present invention relates generally to computer-implemented trademark systems and computer-assisted trademark brokerage business methods.

As the degree of interest and value of trademarks increase, and the number of trademark applications and registrations grow, the needs of individual trademark purchasers and trademark owners naturally change.

Advertising and marketing agencies as well as industrial companies and individuals all want instant results and find the process of searching, clearing, prosecuting, and registering a mark to be highly frustrating, expensive, and full of uncertainty. Attorneys frequently have great difficulty in clearing marks or finding marks that are available for use and registration for their client. Expansive use or financial investment in a mark before it has registered is generally not preferred. Similarly, individuals find the searching and registration process to be a quagmire which more often than not, translates into individuals never acquiring a trademark registration. Today's trademark seekers voice a constant need to change not only the lengthy clearance and prosecution process, they typically detest the year or two wait before ascertaining whether a mark will ultimately register.

On the opposite end of the spectrum, are those trademark owners with a portfolio of marks that are no longer of interest or being used. For example, most marks that were once "hot" or popular eventually diminish in appeal and value (unless it is a really "big" mark) and die a natural trademark death by failure to maintain or renew the registration. This group has difficulty in readily finding willing buyers for their trademarks.

The present invention addresses the aforementioned disadvantages as well as other disadvantages through a computer-assisted trademark brokerage system and method. The computer-implemented system and method of the present invention facilitate the brokering of trademarks between trademark owners and potential trademark buyers. The system stores trademarks of potential sellers and obtains identification descriptions associated with each of the trademarks. A trademark brokerage database is then populated with these trademarks and with the descriptions. The trademarks in the trademark brokerage database are made available through a network for acquisition by potential buyers. The system provides access to the trademark brokerage database through suitable browser interfaces, allowing potential trademark buyers to enter queries related to the trademark subject matter that interests them. The database is configured so that trademarks are associated with information reflective of the registered subject matter (e.g., description of goods and services and/or international trademark classification). This allows the potential buyer to identify offered marks that fit the potential buyer's trademark needs. The system generates query results based on the user's query and presents those results to the potential buyers via the browser interface.

In one embodiment, potential buyers may acquire a trademark on-line by interaction with the trademark brokerage system. In another embodiment, a broker acts as an intermediary, putting buyer and seller in contact with one another using information stored in the database regarding identity of trademark owner (seller) and buyer. The database may include a field reflective of asking price and bid price for some or all of the trademarks stored in the system.

The present invention focuses upon the unique and distinguishable attributes of trademarks in order to build and operate the novel trademark brokerage system. For example, but not limited to, trademarks are unique and distinguishable in that not all trademarks can be utilized by all people for all or most situations. Trademarks are integrally entwined with how and when they are used which substantially complicates the acquisition of trademarks as well as the ascertainment of their value. This coupling of trademarks with their usage distinguishes them from other property and is incorporated along with other aspects of trademark acquisition in the novel trademark brokerage system.

For a more complete understanding of the invention, its objects and advantages, reference should be made to the following specification and to the accompanying drawings.

DESCRIPTION OF THE PREFERRED EMBODIMENT

Figure 1:
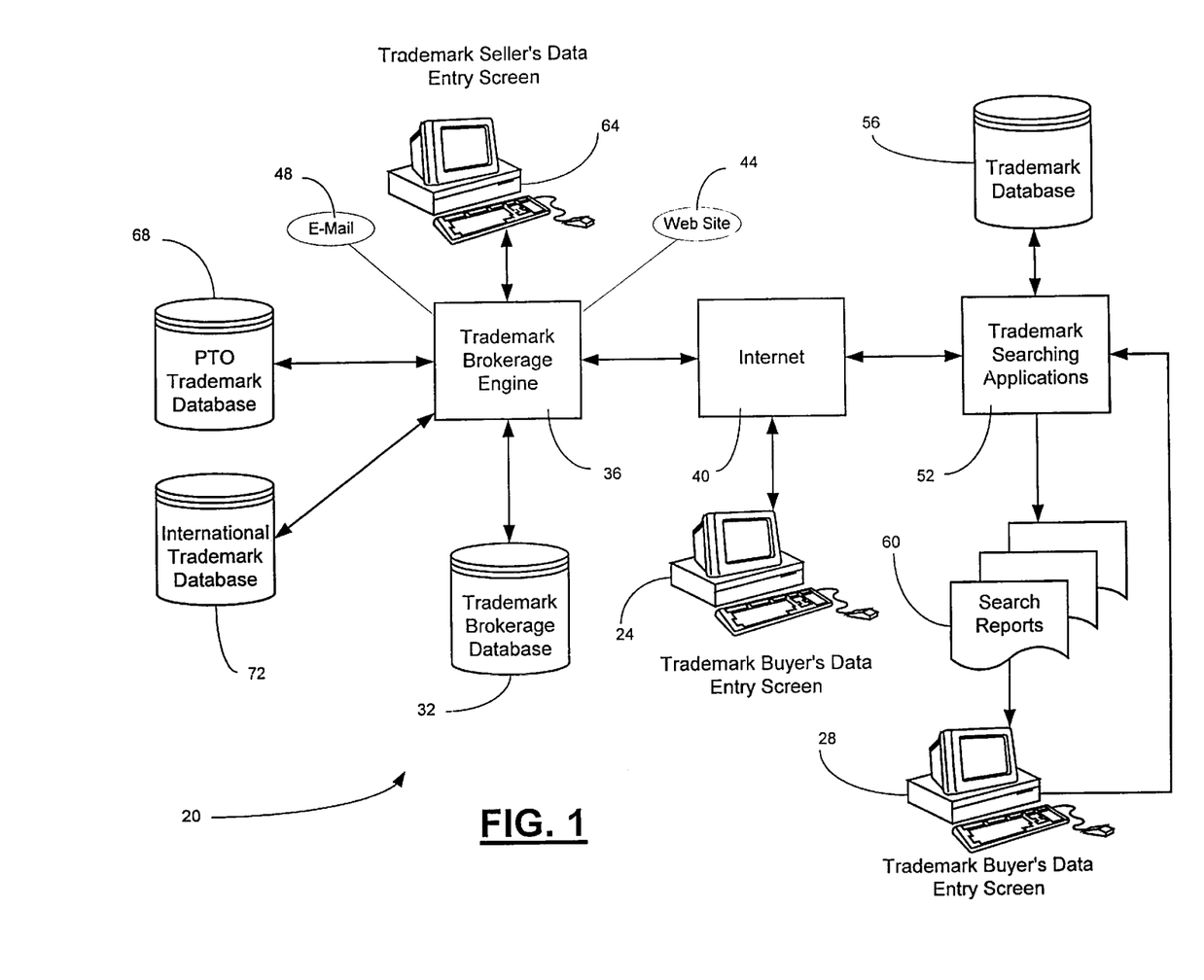
FIG. 1 is a block diagram depicting the computer-implemented components utilized to perform trademark brokerage operations.

FIG. 1 depicts a presently preferred embodiment of the computer-implemented trademark brokerage system 20 wherein potential trademark buyers utilize computers 24 and 28 to determine whether suitable trademarks are available for purchase from a trademark brokerage database 32. Computers 24 and 28 are connected to a trademark brokerage engine 36 which mediates the information exchange between users and trademark brokerage engine 36. Computers 24 and 28 are connected to trademark brokerage engine 36 via a network, such as, but not limited to a network which communicates through common protocols such as via the Internet 40.

Trademark brokerage engine 36 administers trademarks which have been identified as available for purchase and have been placed in trademark brokerage database 32. Trademark brokerage engine 36 preferably communicates with potential buyers through an interactive website 44 or by Internet electronic mail (e-mail) 48. Trademark brokerage engine 36 receives queries from potential trademark buyers for trademarks which are related to a particular goods or services. For example, but not limited to, a potential trademark buyer might need to obtain a registered trademark in the very near future (such as, in a few months) for a new clothing line which is to become available in stores. Such a potential trademark buyer would enter a search request at computer 24 through website 44 that inquires whether any trademarks are available for sale from trademark brokerage database 32 which are related to clothing. The present invention allows the potential buyer to express the search query by specifying a description of the desired goods or services, or by specifying a particular trademark classification, such as an International trademark classification. For instance, a potential trademark buyer might specify in the descriptions portion data entry field of the website 44 that the description of the trademark should relate to clothing. Alternatively, a potential trademark buyer may specify that the potential buyer is interested in trademarks which reside within the International trademark class 25 which is related to clothing.

In this non-limiting example, trademark brokerage engine 36 determines whether any trademarks within trademark brokerage database 32 satisfy such a search request. If any trademarks do satisfy the search request, trademark brokerage engine 36 provides such available trademarks to the user on computer 24. Trademark brokerage engine 36 can provide the search results either by displaying them to the user via a web page on website 44 which, due to security reasons, is only viewable to the potential buyer at computer 24. The web page also provides information related to the purchase of the one or more suitable trademarks. Such information includes a name, e-mail address, telephone number, etc. in order to contact someone regarding purchasing of the trademark. Such information also includes a preferred sale price for the trademark. The potential buyer can communicate with the contact person if the potential buyer has questions regarding any of these selected trademarks. However, the preferred embodiment of the present invention includes a web page wherein a potential buyer can purchase or at least express an interest in one or more of the trademarks automatically through a web page or through electronic mail which activity then is recorded in trademark brokerage database 32.

The present invention also includes a novel feature of integrating search results from the trademark brokerage engine 36 with search results from such trademark searching applications 52 as, but not limited to, the Dialog® trademark searching application or the Thomson & Thomson® trademark searching application. Trademark searching applications 52 receive trademark search requests from a user at computer 28 to search for trademarks typically based upon a particular goods description or services description or trademark classification. Trademark searching applications 52 have access to a trademark database 56 for determining which registered marks in trademark database 56 satisfy the user's search request. Trademark database 56 typically includes all state registered trademarks, all federally registered trademarks, or all foreign registered trademarks.

Trademark searching applications 52 transmit the search request from the user to trademark brokerage engine 36 so that trademark brokerage engine 36 can determine which trademarks are available for purchase which satisfy the user's search request. Trademark searching applications 52 merge the results from trademark brokerage engine 36 with the search results from trademark database 56 in order to provide search reports 60 to the user at computer 28. In this manner, the traditional search report from such trademark searching applications as Dialog® are enhanced to not only include what marks satisfy a user's search request, but also which marks are also available for purchase. However, it should be understood that the present invention also includes trademark brokerage engine 36 receiving search results from trademark searching applications 52. Thereupon, trademark brokerage engine 36 merges its own trademark brokerage search results from trademark brokerage database with the search results from trademark searching applications 52.

Trademarks brokerage engine 36 populates trademark brokerage database 32 with trademarks that are available for purchase. In the preferred embodiment, a trademark seller's data entry screen on computer 64 is utilized to enter, modify, and monitor the trademarks for purchase from trademark brokerage database 32. In the preferred embodiment, the present invention uses e-mail and web pages in a substantially automated manner to notify and arrange for a trademark owner to place its trademark for purchase in trademark brokerage database 32. Trademark brokerage engine 36 determines potential trademarks for purchase by querying remote trademark databases, such as, but not limited to, the United States Patent and Trademark Office (PTO) database 68 or an International trademark database 72. Such queries by trademark brokerage engine 36 include which registered trademarks require renewal or an affidavit, such as, but not limited to an affidavit under Section 8 or Section 15 of the Lanham Act.

International trademark database 72 includes trademarks from countries other than the United States. In fact, the present invention is particularly well-suited to addressing the needs of the trademark community in handling international trademarks. For example, the present invention allows the trademark community to acquire a mark or family of marks in one or more foreign countries. The present invention may thus allow a company to start-up in foreign countries, for example, for $50,000 rather than for $200,000 which it would take to prosecute and register trademarks in the foreign countries.

The determination of which trademarks are in such a state provides an indication as to which trademarks are most probable to be desired to be sold by current trademark owners. The basis for this heightened probability is due to trademark owners being more likely to sell their trademarks when fees are due in order to maintain the trademarks.

Trademark brokerage engine 36 contacts trademark owners whose trademarks are in such a state preferably automatically via electronic mail. The electronic mail address of the trademark owners are determined preferably via establishing an association between the trademark owners name from the trademark database with e-mail addresses provided by such Internet e-mail look-up tools as, Yahoo!® or Lycos®). However, it is to be understood, that the present invention is not limited to only contacting trademark owners through electronic means, but also includes contacting trademark owners via such means as by telephone or postal mail. However, such additional means can be automated by having letters automatically generated by trademark brokerage engine 36 in order to contact trademark owners as to whether they desire to sell their trademarks. Additionally, it is to be understood that the present invention is not limited to only determining available trademarks for purchase via which trademarks have fees or other trademark activities due to them within a predetermined time, but also includes determining possible suitable trademarks for purchase via such other means as, but not limited to, advertising on website 44 that trademark owners can make their trademarks available for purchase via the novel trademark brokerage system 20.

The typical trademark seller might be a corporation with one to hundreds of marks that are not being used or that are being phased out and hence no longer have value to the registrant. A registrant is preferably asked to sign an exclusive listing agreement whereby a percentage of the sale of all registered marks listed in its database would be received. Listing a mark is preferably free of charge to the registrant trademark sellers who are free to retain their usual counsel for the actual transfer or arrange for the assignment directly via website 44.

From the registrant's vantage point, the registrations it lists in trademark brokerage database 32 are not marketable and for the first time, a registrant has an opportunity to do something with assets that are sitting in a file cabinet. In-house counsel are invited through this novel system to annually purge portfolios by placing marks in the trademark brokerage database 32, thereby creating the opportunity to generate income from otherwise illiquid assets. In addition, with the present invention's ability as discussed above to readily access data about all registered marks which are at certain costly maintenance stages (i.e., due for a Section 8 affidavit within one year or renewal within one year), these registrants are invited to consider placing their registered marks in trademark brokerage database 32. Large portfolio owners and individual owners utilize the present invention so that a large cache of registered marks are quickly developed.

The United States Patent and Trademark Office (PTO) reports that there are thousands of registrations that lapse annually—all of which may have appeal if listed and sold. Conversely, many corporations and individuals would prefer to spend their resources on immediately acquiring a registered mark rather than spending those same resources on the time consuming task of clearing, prosecuting and attempting to obtain a mark that may never register. As shown in the example above, the clothing industry exhibits the problems which the present invention solves since marks in that industry typically are only used for a year or two (the time it takes to obtain a registration) and then discarded for new marks. The present invention provides the certainty desired by mass producers as well as by others long before a new mark could even be "cleared." To further enhance the appeal of utilizing the present invention to the legal profession and to others, "finder fees" or "rebate" like incentives for counsel referral, buying and selling are also utilized.

An analysis of a trademark's registrant's prior use and the value associated therewith is preferably maintained in a secured area of the trademark brokerage database 32.

Preferably, the "inventory" or those marks which would be available for purchase continue to be owned by the respective registrants. Hence, the overhead costs and associated risk significantly less than usual and continue to be low since the inventory need not be purchased at the beginning to generate income.

It should be also understood that the present invention includes a buyer making an acquisition of a trademark through such legal techniques as, but not limited to, a transfer of title in the trademark from the trademark owner to the buyer (i.e., an assignment), or through a buyer obtaining an exclusive or non-exclusive license to use the trademark.

Figure 2:
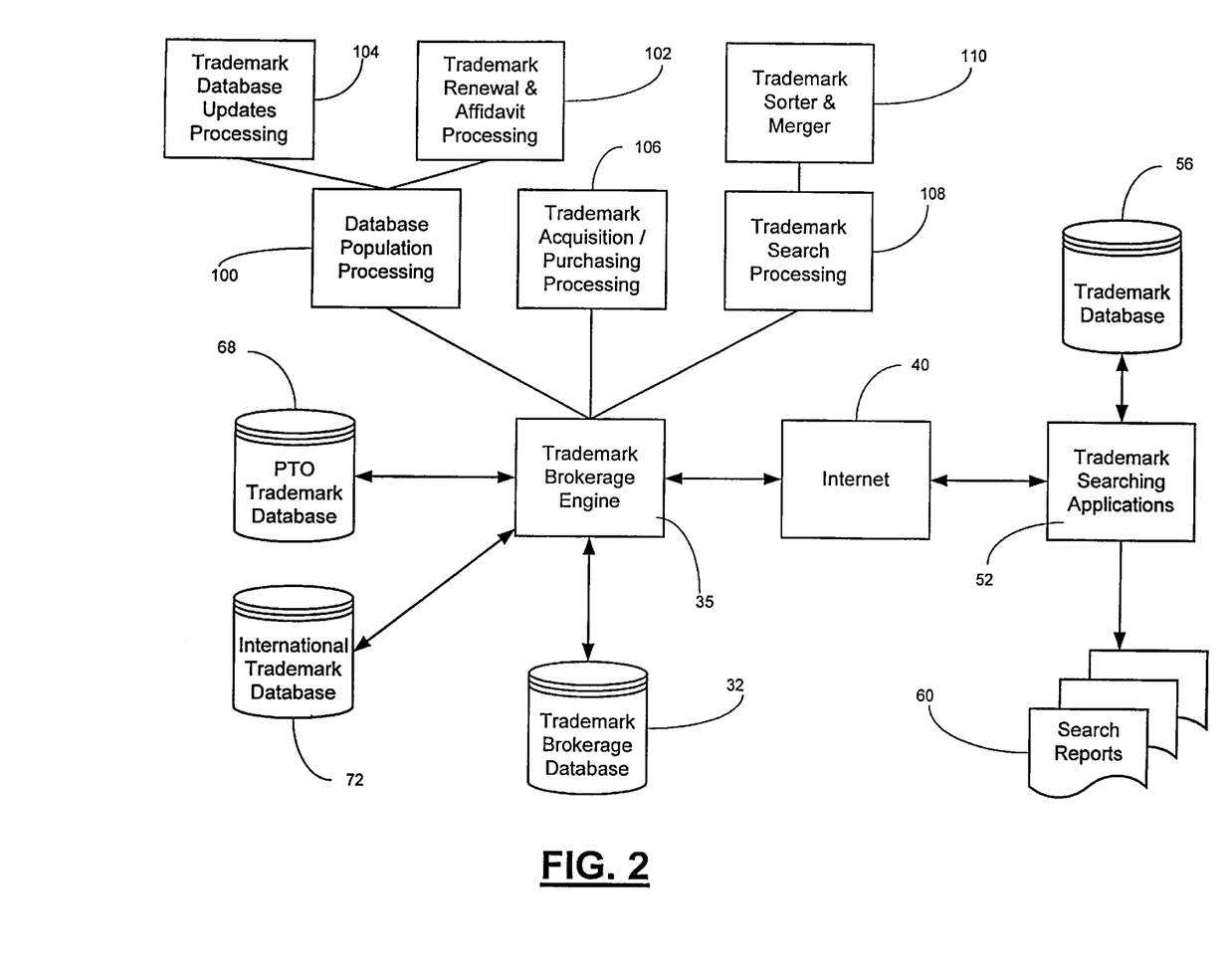
FIG. 2 is a block diagram depicting certain operations of the trademark brokerage engine of FIG. 1.

With reference to FIG. 2, trademark brokerage engine 36 performs a number of operations in order to handle the trademark seller and buyer interfaces with trademark brokerage database 32. Trademark brokerage engine 36 performs database population processing operation 100 in order to ensure that trademark brokerage database 32 has trademarks available for purchase. Database population processing operation 100 includes the operation of trademark renewal and affidavit processing 102. Operation 102 includes querying remote databases such as, but not limited to PTO trademark database 68 and International trademark database 72 to determine which trademarks are ready for renewal and/or affidavit activity. Database population processing operation 100 includes not only initially populating trademark brokerage database 32 with trademarks for purchase, but also includes trademark database updates processing 104 in order to determine at predetermined time intervals what new trademarks might have a high probability of being available for purchase. Operation 104 includes performing the operations of block 102, but also includes determining which trademarks have already been processed by trademark brokerage engine 36 in previous population operations.

Trademark acquisition/purchasing processing 106 provides functionality for handling the automated transmittal of notices to trademark owners about whether they are interested in selling their trademarks. Operation 106 also handles the potential buyer's information involved in acquiring trademarks.

Trademark brokerage engine 36 includes trademark search processing operation 108 in order to handle queries from potential buyers about which trademarks are for sale. Operation block 108 includes a trademark sorter and merger 110 in order to sort the search results for easier viewing by potential buyers. For example, trademark sorter 110 sorts the search results based upon trademark classification so that the user can better ascertain which marks are most suitable for the user's situation at hand. Moreover, operation block 108 in one embodiment includes a merger in order to merge search results from trademark brokerage database 32 and trademark searching applications 52.

Figure 3A:
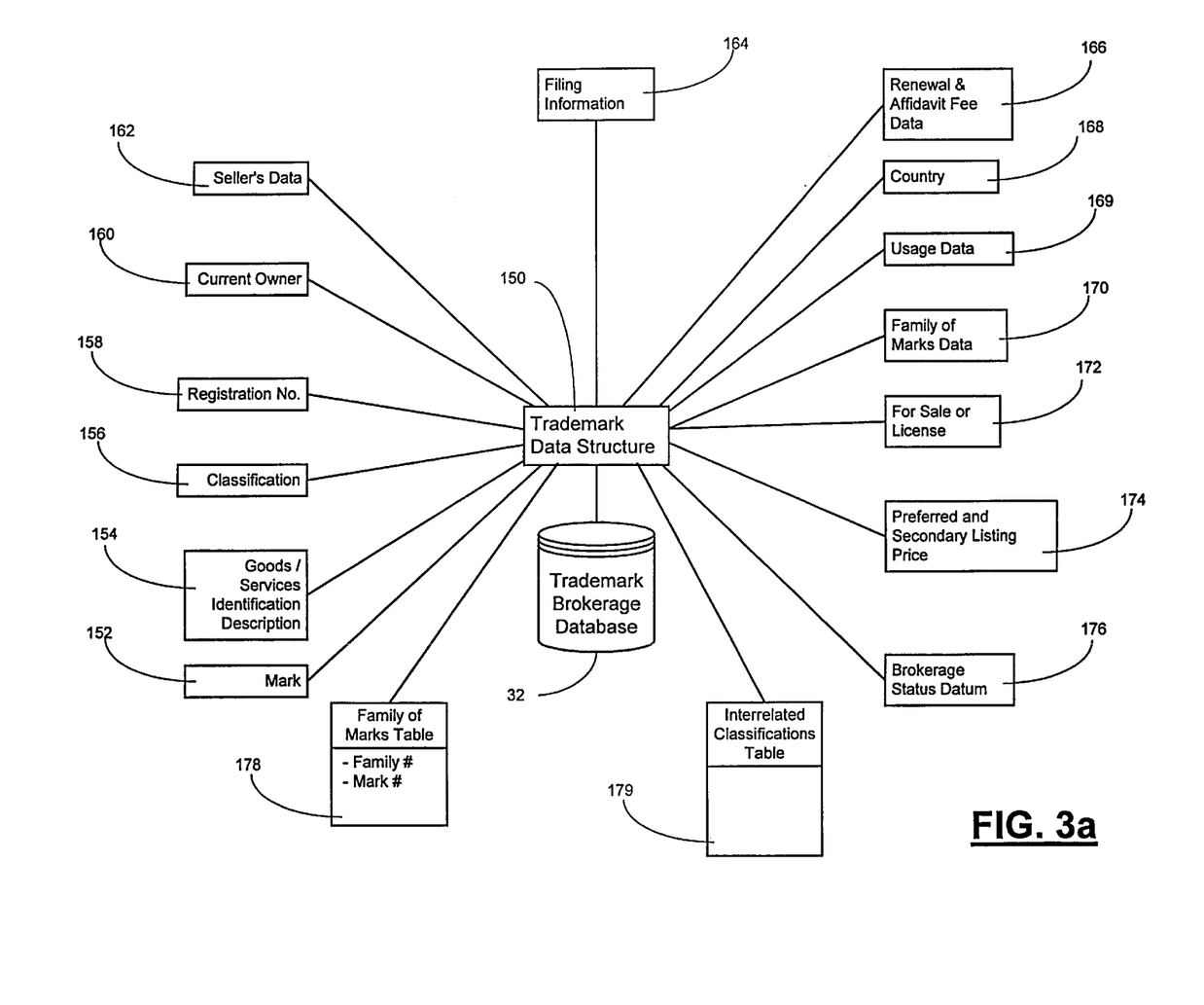
FIGS. 3a–3b are data structure hierarchy diagrams depicting the data structures associated with the trademark brokerage database.

FIG. 3a depicts the trademark data structure 150 which is preferably utilized within trademark brokerage database 32. Trademark data structure 150 includes a mark field 152 which contains the name of the mark. Moreover, field 152 includes whether the mark is a stylized mark or for the letters themselves. If the mark is a stylized mark, then the field would also depict a drawing of the stylized mark. Identification description field 154 within trademark data structure 150 provides a textual description of the goods or services for the mark in field 152. For example, for the mark MILLENIUM MAGNITUDE®, the identification description is "Clothing, namely, T-shirts and caps".

Field 156 includes classification information for a mark including sub-fields for both an International trademark classification number as well as an United States trademark identification number. Field 158 identifies the registration number for a mark, and field 160 identifies the current owner of the trademark. Field 162 contains data related to who should be contacted regarding purchasing a particular mark.

Field 164 includes filing information regarding a mark, and field 166 includes renewal and affidavit fee data. Field 168 indicates the country within which the mark has been registered. Field 169 includes usage data about how long a particular mark has been used. Usage data is unique to trademarks since non-use of a trademark directly affects the value of the trademark.

Field 170 indicates whether a particular mark is part of a family of marks. When a mark has been registered in many different ways or classes, that is, with a different prefix or suffix with other words or designs and the dominant portion of the several marks are the same or similar and owned by the same registrant, this is considered a family of marks. Marks that are in a family may have considerable more value. For example, a highly valuable family of marks include McDonald's ®, Big Mac®, Mac Attack ®, Big Mac Attack ®, etc. Field 170 indicates whether a particular mark is part of a family of marks. In the preferred embodiment, a family of marks table 178 is provided for indicating which marks belong to which families. The family of marks table 178 associates a mark's number (such as, registration number) with a family number that designates a particular family of marks.

Field 172 indicates whether a mark is for sale or for license, and field 174 indicates a preferred listing price and a secondary listing price. In the preferred embodiment, only the preferred listing price is shown to a potential buyer while the secondary listing price is utilized by the seller identified in field 162 in order to determine the permissible price range within which a trademark owner has indicated that a trademark should be sold. Field 176 is a brokerage status datum which indicates whether a particular mark has already been purchased by a trademark buyer or has been indicated by a trademark owner as not being available for purchase.

Field 176 is used to determine which trademarks have already been processed previously by trademark brokerage engine 36 so that during trademark brokerage database updates, trademarks which have already been identified as not for sale via field 176 are not repopulated with each new update nor their trademark owners notified as to whether the trademark owners are interested in selling their trademarks.

Figure 3B:
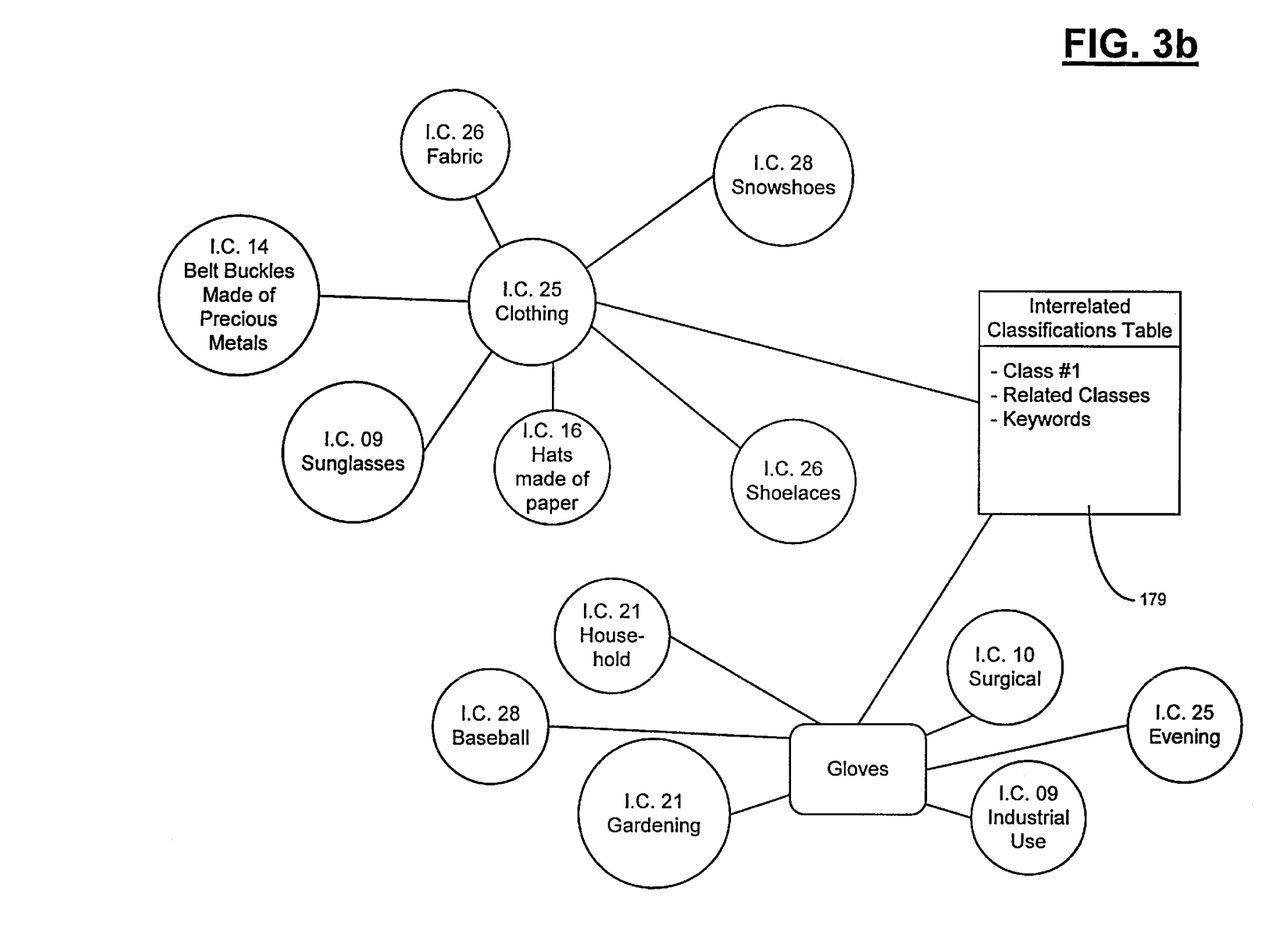

Table 179 is provided to interrelate trademark classifications and whose preferred data structure is depicted in FIG. 3b. With reference to FIG. 3b, interrelated classifications table 179 interrelates trademark classifications with each other so that potential buyers can peruse more trademarks for sale. Several trademark classifications may hold marks directed to similar goods or services.

For example, a potential buyer may specify a mark for clothing. The present invention utilizing interrelated classifications table 179 informs the user that several trademark classifications are available for searching, such as, but not limited to: international classification 25 for clothing; international classification 28 for snowshoes; international classification 26 for fabric; international classification 14 for belt buckles made of precious metals; international classification 09 for sunglasses; international classification 16 for hats made of paper; and international classification 26 for shoelaces. The potential trademark buyer can select one or more of these classifications to perform a search for trademarks to buy. In an alternate embodiment, the present invention automatically uses the classifications which are associated with each other in order to search the trademark brokerage database.

As another non-limiting example, the interrelated classifications table 179 has interrelated the keyword "gloves" with several classifications, such as international classification 10 for surgical, international classification 25 for evening attire. In such a manner, the present invention assists potential buyers to better locate trademarks for sale whose use coincides with what the potential buyer requires of the mark.

Figure 4A:
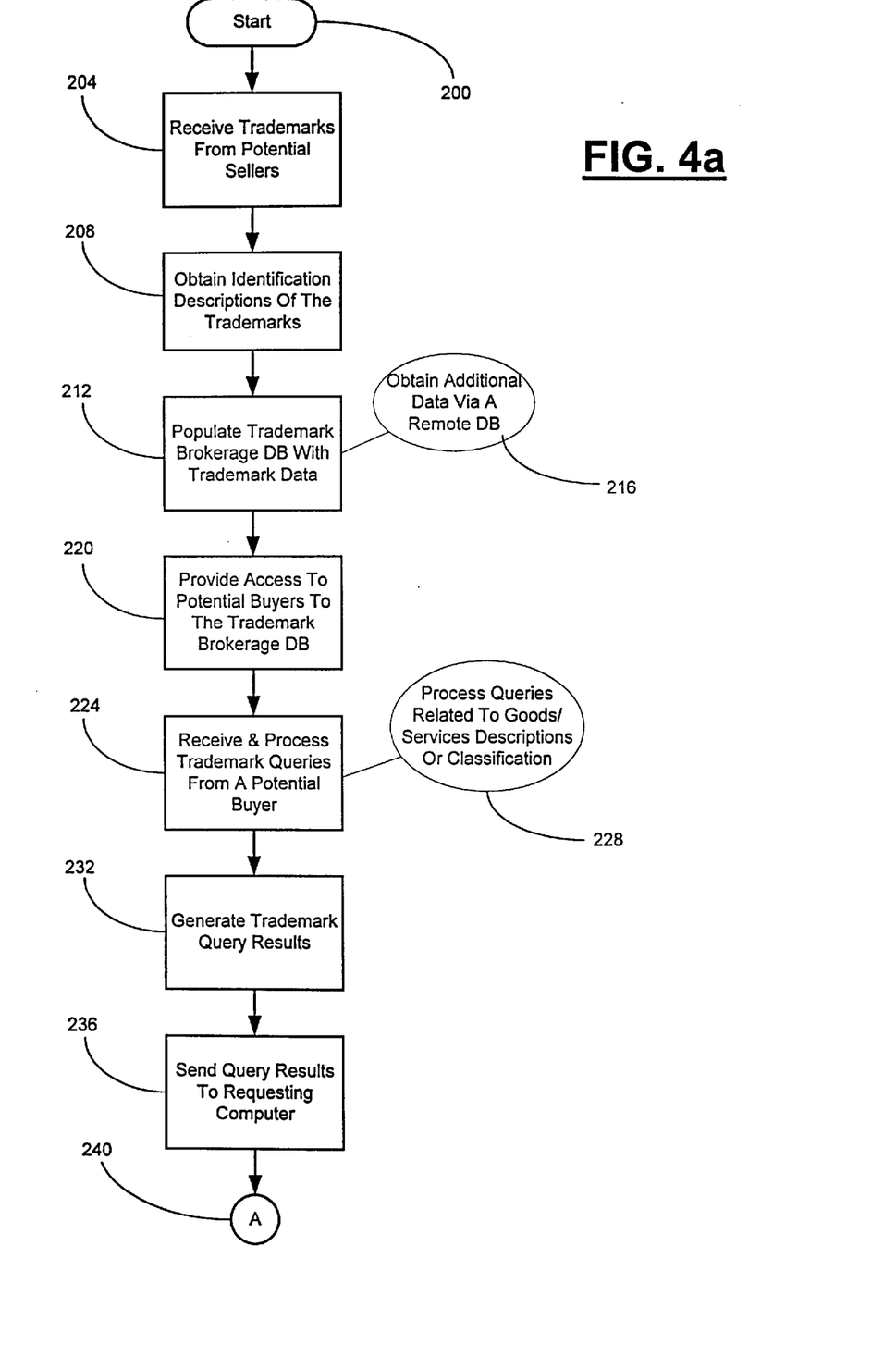
FIGS. 4a–4b are flow charts depicting the operational steps involved in processing trademark brokerage queries.
Figure 4B:
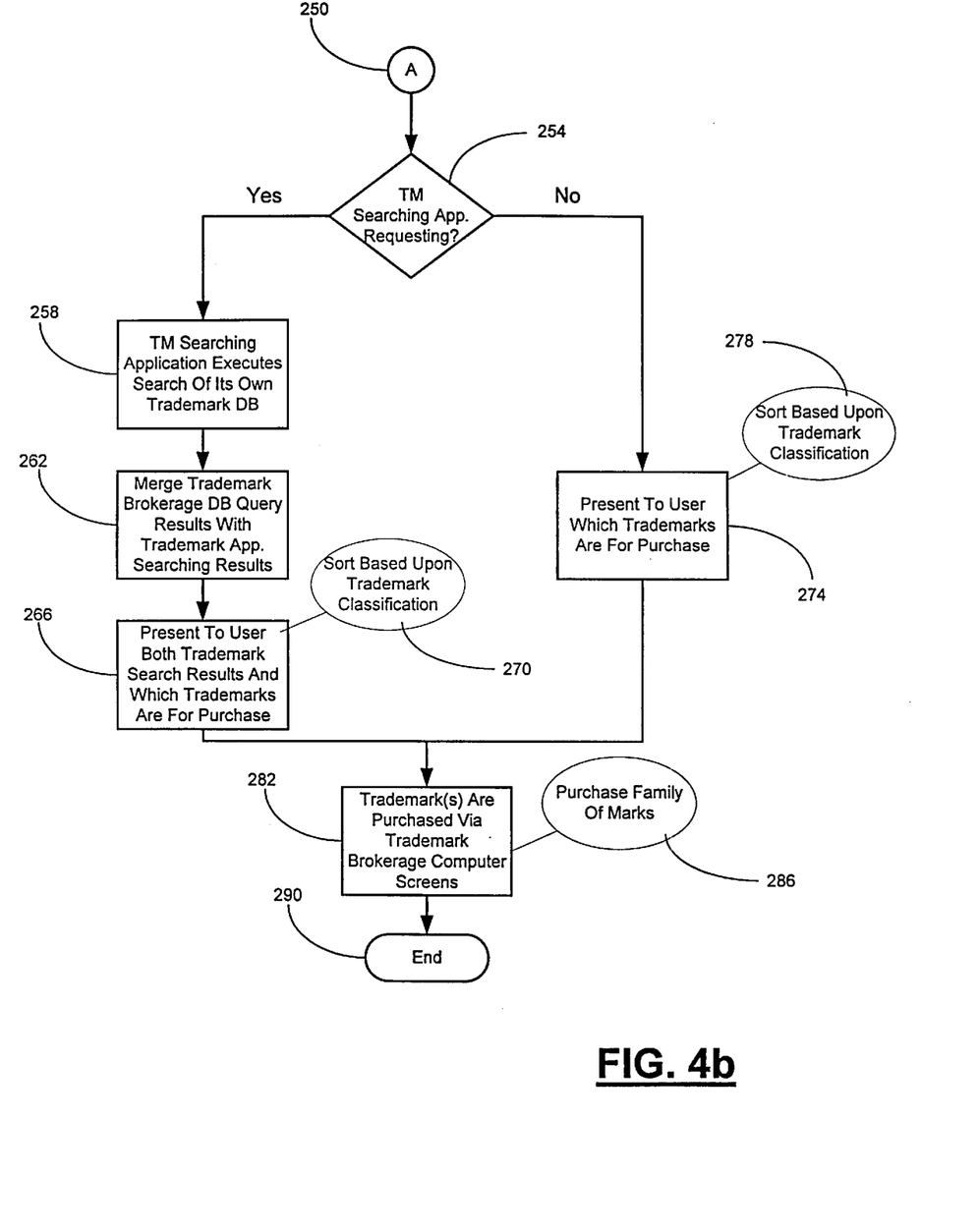

FIGS. 4a–4b illustrate processing associated with populating the trademark brokerage database and processing related to trademarks being purchased by potential buyers. Start indication block 200 indicates that process block 204 is to be executed. Process block 204 receives trademarks from potential sellers, and process block 208 obtains identification descriptions of the received trademarks. Process block 212 populates the trademark brokerage database with trademark data and preferably uses function 216 in order to obtain additional data about the received trademarks via a remote database, such as via the PTO database.

Process block 220 provides access to potential buyers to the trademark brokerage database, and process block 224 receives and processes trademark queries from potential buyers. Preferably, process block 224 processes queries related to goods and/or services descriptions as well as related to trademark classifications as indicated by function 228.

Process block 232 generates trademark query results based upon which trademarks in the trademark brokerage database satisfy the constraints of the query from the potential buyers. Process block 236 sends the query results to the requesting computers. Processing continues on FIG. 4b at continuation block A 240.

With reference to FIG. 4b, decision block 254 inquires whether a trademark searching application such as Dialog® had transmitted the search request to the trademark brokerage engine. If a trademark searching application had performed the request, then processing continues at process block 258. At process block 258, the trademark searching application executes a search of its own trademark database in order to identify all trademarks (i.e., irrespective of whether they are for purchase or not) that satisfy the user's query. Process block 262 merges the trademark brokerage database search results with the trademark application searching results. Process block 266 presents to the user the merged trademark search results which preferably have been sorted by function 270 based upon trademark classification.

Process block 282 permits a user to purchase one or more trademarks which are included in the trademark search results via the trademark brokerage computer screens. Preferably, process block 282 includes function 286 which allows for purchasing of a family of marks. Processing terminates at end block 290.

If a trademark searching application had not transmitted the search request to the trademark brokerage engine as determined by decision block 254, then processing is performed by process block 274. Process block 274 presents to the user which trademarks are for purchase as determined by the trademark brokerage engine. Preferably, process block 274 includes function 278 which sorts the trademark results based upon trademark classification. Processing continues at process block 282 and then terminates at end block 290.

Figure 5:
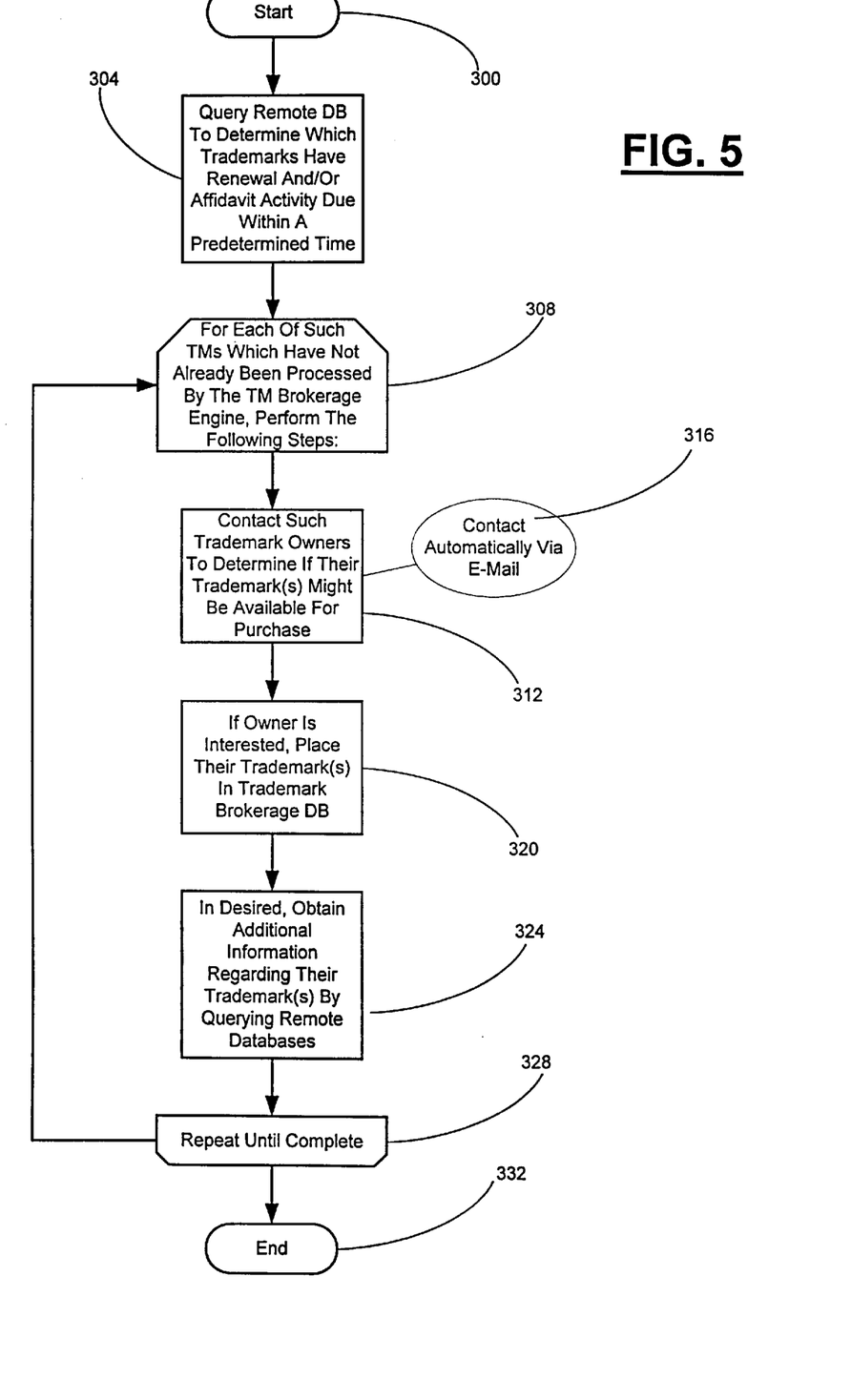
FIG. 5 is a flow chart depicting the operational steps associated with acquiring trademarks from trademark owners.

FIG. 5 is a flow chart depicting the operational steps associated with the preferred method for populating the trademark brokerage database. Start indication block 300 indicates that process block 304 is to be executed. Process block 304 queries a remote database in order to determine which trademarks have a renewal and/or affidavit activity due within a predetermined time. In the preferred embodiment, the predetermined time is one year before such renewal or such affidavit activity is required for a particular trademark.

Iteration block 308 indicates that for each of the trademarks determined by process block 304 which have not already been processed by the trademark brokerage engine in the past (as determined preferably by a brokerage status datum), the following steps are performed. At process block 312, trademark owners of such trademarks as identified by iteration block 308 are contacted to determine if their trademarks might be available for purchase. Process block 312 preferably includes function 316 wherein such trademark owners are contacted automatically via e-mail.

At process block 320, if a trademark owner is willing to have a trademark available for purchase, the trademark is placed in the trademark brokerage database. If desired, process block 324 obtains additional information regarding the trademark by querying remote databases so that such information as filing date and goods and services identification descriptions can be obtained. Preferably process block 324 queries the remote databases based upon trademark registration numbers. Iteration completion block 328 determines whether any more trademarks as determined by iteration block 308 need to be processed by process blocks 312, 320, and 324. If processing is complete for all such trademarks, then processing terminates at end block 332.

While the invention has been described in its presently preferred form, it is to be understood that there are numerous applications and implementations for the present invention. Accordingly, the invention is capable of modification and changes without departing from the spirit of the invention as set forth in the appended claims.

It is claimed:

1. A computer-implemented method for brokering trademarks, comprising the steps of:

receiving trademarks from potential sellers;

obtaining identification descriptions associated with each of said trademarks;

populating a trademark brokerage database with said trademarks and said identification descriptions, where said trademarks in said trademark brokerage database being available for acquisition by potential buyers;

providing access to said trademark brokerage database for said potential buyers of said trademarks;

receiving from said potential buyers trademark queries related to said identification descriptions;

generating trademark query results based upon which trademarks satisfy said received queries;

presenting said query results to said potential buyers, wherein at least one of said potential buyers acquires one of said trademarks that is in said trademark brokerage database based upon said query results;

querying a remote database for additional trademarks to sell based upon trademark maintenance data or trademark affidavit data, said additional trademarks not being available at a first point in time in the trademark brokerage database for acquisition by said potential buyers;

receiving from said remote database said new trademarks whose maintenance fees or affidavits are due within a predetermined period;

determining at least one owner of said new trademarks who has indicated that the owner's respective trademark is to be placed in said trademark brokerage database as being available for acquisition by a potential buyer;

populating said trademark brokerage database with said new trademark of said determined owner; said new trademark in said trademark brokerage database being available for acquisition by potential buyers;

receiving from said potential buyers trademark queries related to said new trademark in said trademark brokerage database;

generating trademark query results based upon said new trademark satisfying said received trademark query; and presenting said trademark query results to said potential buyers, wherein at least one of said potential buyers acquires said new trademark in said trademark brokerage database based upon said trademark query results.

2. The method of claim 1 further comprising the steps of:

receiving trademark registration numbers from said potential sellers, said trademark registration numbers being indicative of said trademarks;

querying a remote database to determine said identification descriptions associated with said trademark registration numbers;

receiving from said remote database said identification descriptions for said trademarks; and populating said trademark brokerage database with said identification descriptions that are received from said remote database and with said trademark registration numbers.

3. The method of claim 2 further comprising the steps of:

querying a remote database to determine trademark classifications associated with said trademark registration numbers;

receiving from said remote database said trademark classifications for said trademarks, said trademark classifications being indicative of said identification descriptions;

populating said trademark brokerage database with said trademark classifications and said identification descriptions received from said remote database;

receiving from said potential buyers trademark queries related to said trademark classifications;

generating trademark query results based upon which trademarks satisfy said received trademark classification queries; and presenting said trademark classification query results to said potential buyers, wherein at least one of said potential buyers acquires one of said trademarks that is in said trademark brokerage database based upon said trademark classification query results.

4. The method of claim 3 wherein said remote database is selected from the group consisting of a United States Patent and Trademark database, a database which contains international trademarks, and combinations thereof.

5. The method of claim 1 wherein at least one of said trademarks in said trademark brokerage database is acquired by a potential buyer through a license of said trademark.

6. The method of claim 1 wherein said potential sellers have title to said trademarks, wherein at least one of said trademarks in said trademark brokerage database is acquired by a potential buyer through a transfer of title of said trademark.

7. The method of claim 6 wherein at least one of said trademarks in said trademark brokerage database is acquired by a potential buyer through a license of said trademark.

8. The method of claim 1 further comprising the steps of:

receiving a family of trademarks from a potential seller;

obtaining identification descriptions associated with each of said trademarks in said family;

populating said trademark brokerage database with said family of trademarks and said identification descriptions;

receiving a query related to said identification descriptions of said trademarks in said family;

generating trademark family query results based upon which trademarks satisfy said received query; and presenting said trademark family query results to said potential buyers, wherein at least one of said potential buyers acquires said family of trademarks that is in said trademark brokerage database based upon said trademark family query results.

9. The method of claim 8 further comprising the step of:

providing a family of marks table for associating which of said trademarks are in said family.

10. The method of claim 1 further comprising the steps of:

associating a first trademark classification with a second trademark classification;

receiving a query from a potential buyer related to said first trademark classification;

determining said second trademark classification is associated with said first trademark classification;

using both said first and second trademark classifications for generating said trademark query results; and presenting said query results to said potential buyer.

11. The method of claim 10 further comprising the steps of:

associating a plurality of trademark classifications with a predetermined keyword;

receiving a query from a potential buyer related to said first trademark classification;

determining said associated trademark classifications based upon said keyword being supplied by said potential buyer;

using said determined trademark classifications for generating said trademark query results; and presenting said query results to said potential buyer.

12. The method of claim 1 further comprising the steps of:

receiving from a remote trademark searching application a query related to said identification descriptions; and providing to said remote trademark searching application first query results based upon which trademarks in said trademark brokerage database satisfy said received query, said first query results being indicative of trademarks which are available for acquisition;

said remote trademark searching application querying a remote database for trademarks related to said identification descriptions;

said remote trademark searching application receiving second query results from said remote database, said second query results being indicative of trademarks in said remote database which satisfy said query from said remote trademark searching application;

said remote trademark searching application generating a trademark search report based upon said first and second query, said remote trademark searching application presenting via said remote trademark searching application said query results to said potential buyers, wherein at least one of said potential buyers acquires one of said trademarks that is in said trademark brokerage database based upon said query results.

* * * * *